(12) United States Patent
He et al.

(10) Patent No.: US 11,999,251 B2
(45) Date of Patent: Jun. 4, 2024

(54) CHARGING STATION WITH CLIMATE CONTROL

(71) Applicant: Rivian IP Holdings, LLC, Irvine, CA (US)

(72) Inventors: Jing He, Novi, MI (US); Henry Huang, Ann Arbor, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/095,628

(22) Filed: Jan. 11, 2023

(65) Prior Publication Data

US 2023/0158906 A1 May 25, 2023

Related U.S. Application Data

(63) Continuation of application No. 17/108,425, filed on Dec. 1, 2020, now Pat. No. 11,577,619.

(51) Int. Cl.
*B60L 53/30* (2019.01)
*B60H 1/00* (2006.01)
*B60L 53/66* (2019.01)
*B60L 53/68* (2019.01)
*B60L 58/24* (2019.01)

(52) U.S. Cl.
CPC .......... *B60L 53/30* (2019.02); *B60H 1/00428* (2013.01); *B60L 53/66* (2019.02); *B60L 53/68* (2019.02); *B60L 58/24* (2019.02)

(58) Field of Classification Search
CPC ..................................................... B60L 53/30
USPC ........................................................ 320/109
See application file for complete search history.

(56) References Cited

U.S. PATENT DOCUMENTS

| 8,350,526 B2* | 1/2013 | Dyer ....................... B60L 55/00 |
| | | 320/109 |
| 10,340,709 B2* | 7/2019 | Dyer ................... H01M 10/443 |
| 10,882,409 B2* | 1/2021 | Nakaso ................... B60L 53/18 |
| 10,913,369 B2* | 2/2021 | Rhodes .................... B60L 53/50 |
| 2005/0172660 A1* | 8/2005 | Anderson ............... F25D 16/00 |
| | | 62/435 |

(Continued)

OTHER PUBLICATIONS

List of References in corresponding U.S. Appl. No. 17/108,425.
Mar. 23, 2022 European Search Report issued in corresponding EP Application EP21204581.

*Primary Examiner* — Jerry D Robbins
(74) *Attorney, Agent, or Firm* — Foley & Lardner LLP

(57) ABSTRACT

A charging station assembly capable of generating and delivering a conditioned airflow while charging a battery of a vehicle. The temperature and flow rate of this conditioned airflow may be controlled based on the ambient conditions and battery status. The conditioned airflow may be directed toward an outside heat exchanger of a refrigerant system of the vehicle to enhance capacity. The conditioned airflow may also be routed to a battery pack for direct cooling or heating through additional ventilation system. In hot ambient conditions, the charging station provides cool air to facilitate battery cooling. In cold ambient conditions, the charging station provides hot air to facilitate battery heating. This charging station assembly shifts the load from the vehicle refrigerant system to the charging system, thereby improving battery thermal management capability, while eliminating the need for an oversized refrigerant system.

19 Claims, 6 Drawing Sheets

(56) References Cited

U.S. PATENT DOCUMENTS

| | | | | |
|---|---|---|---|---|
| 2009/0256523 | A1* | 10/2009 | Taguchi | B60L 53/18 |
| | | | | 165/104.11 |
| 2010/0089669 | A1* | 4/2010 | Taguchi | B60L 58/15 |
| | | | | 180/65.1 |
| 2012/0003910 | A1* | 1/2012 | Richter | B60H 1/00385 |
| | | | | 454/141 |
| 2012/0041855 | A1* | 2/2012 | Sterling | B60L 53/52 |
| | | | | 320/109 |
| 2014/0012447 | A1* | 1/2014 | Gao | B60L 58/13 |
| | | | | 701/22 |
| 2014/0193683 | A1* | 7/2014 | Mardall | B60K 1/04 |
| | | | | 429/99 |
| 2014/0292260 | A1* | 10/2014 | Dyer | B60L 53/65 |
| | | | | 320/137 |
| 2015/0054460 | A1* | 2/2015 | Epstein | B60L 58/27 |
| | | | | 320/109 |
| 2015/0306974 | A1 | 10/2015 | Mardall et al. | |
| 2017/0088005 | A1* | 3/2017 | Christen | B60L 53/14 |
| 2017/0088007 | A1* | 3/2017 | Melendez | B60L 53/302 |
| 2019/0047429 | A1* | 2/2019 | Torkelson | H01M 10/625 |
| 2019/0168593 | A1 | 6/2019 | Nakaso et al. | |
| 2020/0338998 | A1* | 10/2020 | Wainwright | B60L 53/66 |

\* cited by examiner

CHARGING STATION WITH CLIMATE CONTROL

CROSS-REFERENCE TO RELATED APPLICATION

The present disclosure is a continuation (CON) of co-pending U.S. patent application Ser. No. 17/108,425, filed on Dec. 1, 2020, and entitled "CHARGING STATION WITH CLIMATE CONTROL," the contents of which are incorporated in full by reference herein.

INTRODUCTION

The present disclosure relates generally to the automotive field. More particularly, the present disclosure relates to a vehicle charging station with climate control. Although the charging of electric vehicles (EVs) is contemplated herein, the present disclosure may be applied to the charging of other electric machines and devices as well.

With the rapid advance of fast charging technologies for vehicles, the cooling demand of batteries during charging has increased dramatically, from a few kW in normal charging to potentially 15+ kW in direct current fast charging (DCFC). Such a large load requires the refrigerant system of a vehicle to be sized well above the standard configuration, especially for charging during hot ambient. For example, the displacement of an electric compressor may have to increase from 30+ cubic centimeter (cc) to 40+ cc or even 50+ cc. The rest components in the system, such as chiller, condenser, and air conditioning (AC) lines, all need to be upsized accordingly. This not only causes significant development and validation efforts, but introduces a system that is generally oversized for the vast majority of use cases. The new system may suffer from packaging constraint, as well as reduced efficiency (hence range loss) due to degraded efficiency of larger compressor and increased system pressure drop. On the other hand, in cold winter months, fast charging may be slowed if the battery temperature is too low. This requires batteries to be heated to enable a sufficient charging rate, taxing the heating system of a vehicle. In extremely cold regions (below −20 degrees C.), enhanced battery heating and shortened charging times are especially desired.

The present background is provided only as illustrative context for the application of the principles of the present disclosure and is not intended to be limiting. It will be readily apparent to those of ordinary skill in the art that the principles of the present disclosure may be applied in other contexts equally.

SUMMARY

To address the aforementioned challenges, the present disclosure provides a charging station assembly capable of generating and delivering a conditioned airflow while charging a battery of a vehicle. The temperature and flow rate of this conditioned airflow may be controlled based on the ambient conditions and battery status. The conditioned airflow may be directed toward an outside heat exchanger of a refrigerant system of the vehicle to enhance capacity. In particular, if the vehicle is equipped with a certain heat pump system, both cooling capacity and heating capacity can be significantly improved through assistance from the external conditioned airflow across the outside heat exchanger. The conditioned airflow may also be routed to the battery pack for direct cooling or heating through additional ventilation system. In hot ambient conditions, the charging station provides cool air to facilitate battery cooling. In cold ambient conditions, the charging station provides hot air to facilitate battery heating. The concept is to shift the load from the vehicle refrigerant system to the charging system, thereby improving battery thermal management capability, while eliminating the need for an oversized refrigerant system.

In one illustrative embodiment, the present disclosure provides a charging station assembly comprising a charging assembly to charge a battery of a vehicle and a climate control assembly to generate a conditioned airflow. The climate control assembly may be integrated with the charging assembly or stand alone as a separate part when integration becomes inconvenient, for example, due to space limitation of the charging assembly, or costly due to interruption on the existing charging assembly design.

In another illustrative embodiment of the charging station assembly, the climate control assembly comprises a remote station generating the conditioned airflow and a fluid transport system delivering the conditioned airflow from the remote station to the vehicle.

In still another illustrative embodiment of the charging station assembly, the climate control assembly comprises a remote station generating a conditioned coolant flow, a coolant-to-air heat exchanger, a fan assembly coupled to the coolant-to-air heat exchanger, and a fluid transport system delivering the conditioned coolant flow from the remote station to the coolant-to-air heat exchanger.

In yet another illustrative embodiment of the charging station assembly, the climate control assembly comprises a local refrigerant unit generating the conditioned airflow.

In another illustrative embodiment of the charging station assembly, the conditioned airflow is directed toward an outside heat exchanger of a refrigerant system of the vehicle.

In still another illustrative embodiment of the charging station assembly, the conditioned airflow is routed to a battery pack of the vehicle for direct cooling or heating through additional ventilation system.

In another illustrative embodiment, the charging station assembly further comprises a control unit operable for controlling a temperature and flow rate of the conditioned airflow.

In still another illustrative embodiment, the charging station assembly further comprises a sensor assembly measuring an ambient temperature and conditioned airflow temperature.

In another illustrative embodiment of the charging station assembly, the control unit controls the temperature and flow rate of the conditioned airflow responsive to at least an ambient temperature.

In yet another illustrative embodiment, the charging station assembly further comprises a data transmittal device reading signals from the vehicle on at least battery pack temperature.

In still yet another illustrative embodiment of the charging station assembly, the control unit controls the temperature and flow rate of the conditioned airflow responsive to at least an ambient temperature and battery pack temperature.

In another illustrative embodiment, the present disclosure provides a charging method comprising charging a battery of a vehicle using a charging assembly, generating a conditioned airflow from a climate control assembly, and delivering the conditioned airflow to the vehicle.

In still another illustrative embodiment of the charging method, the climate control assembly comprises a remote station generating the conditioned airflow and a fluid transport system delivering the conditioned airflow from the remote station to the vehicle.

In yet another illustrative embodiment of the charging method, the climate control assembly comprises a remote station generating a conditioned coolant flow, a coolant-to-air heat exchanger, a fan assembly coupled to the coolant-to-air heat exchanger, and a fluid transport system delivering the conditioned coolant flow from the remote station to the coolant-to-air heat exchanger.

In still yet another illustrative embodiment of the charging method, the climate control assembly comprises a local refrigerant unit generating the conditioned airflow.

In another illustrative embodiment, the charging method further comprises controlling a temperature and flow rate of the conditioned airflow using a control unit.

In still another illustrative embodiment, the charging method further comprises measuring an ambient temperature and conditioned airflow temperature using a sensor assembly.

In still yet another illustrative embodiment, the charging method further comprises controlling the temperature and flow rate of the conditioned airflow responsive to at least an ambient temperature.

In yet another illustrative embodiment, the charging method further comprises reading signals from the vehicle on at least battery pack temperature using a data transmittal device.

In still another illustrative embodiment, the charging method further comprises controlling the temperature and flow rate of the conditioned airflow responsive to at least an ambient temperature and battery pack temperature.

In the following description, there are shown and described embodiments of a charging station assembly and related charging methods. As it should be realized, the assembly and methods are capable of other, different embodiments and their several details are capable of modification in various, obvious aspects all without departing from the charging station assembly and charging methods as set forth and described in the following claims. Accordingly, the drawings and descriptions should be regarded as illustrative in nature and not restrictive.

BRIEF DESCRIPTION OF THE DRAWINGS

The present disclosure is illustrated and described herein with reference to the various drawings, in which like reference numbers are used to denote like assembly components/method steps, as appropriate, and in which.

DETAILED DESCRIPTION

The present disclosure provides a charging station assembly capable of generating and delivering a conditioned airflow while charging a battery of a vehicle. The temperature and flow rate of this conditioned airflow may be controlled based on the ambient conditions and battery status. The conditioned airflow may be directed toward an outside heat exchanger of a refrigerant system of the vehicle to enhance capacity. In particular, if the vehicle is equipped with a certain heat pump system, both cooling capacity and heating capacity can be significantly improved through assistance from the external conditioned airflow across the outside heat exchanger. The conditioned airflow may also be routed to the battery pack for direct cooling or heating through additional ventilation system. In hot ambient conditions, the charging station provides cool air to facilitate battery cooling. In cold ambient conditions, the charging station provides hot air to facilitate battery heating. The concept is to shift the load from the vehicle refrigerant system to the charging system, thereby improving battery thermal management capacity, while eliminating the need for an oversized refrigerant system.

Figure 1:
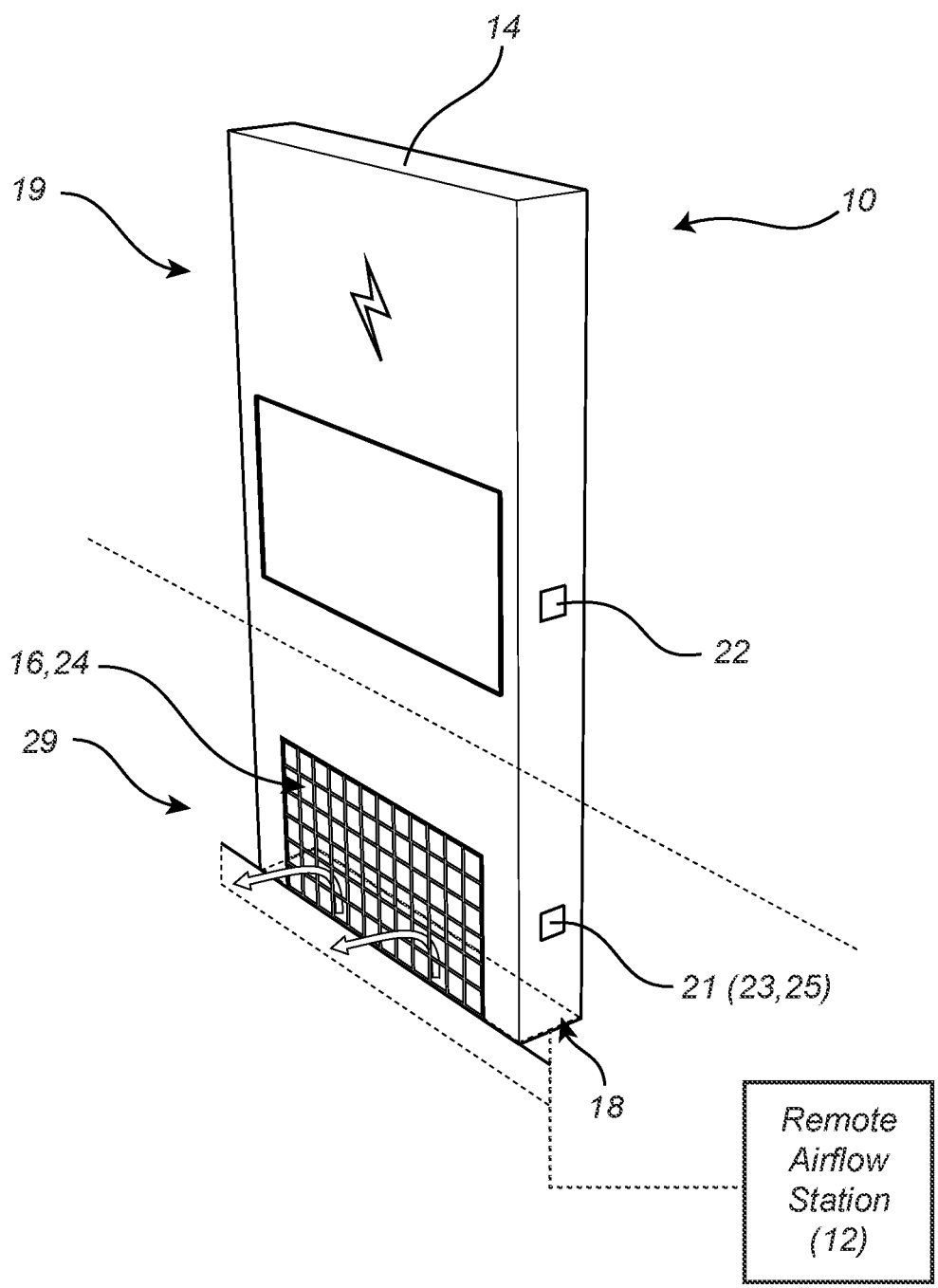
FIG. 1 is a schematic diagram of one illustrative embodiment of the vehicle charging station assembly of the present disclosure, utilizing a remote airflow station.

FIG. 1 is a schematic diagram of one illustrative embodiment of the vehicle charging station assembly 10 of the present disclosure, utilizing a remote airflow station 12. The charging station assembly 10 comprises a charging assembly 19 and a climate control assembly 29. The charging assembly 19 includes a control console 14 operable for directing standard and/or fast charging operations to a vehicle to be charged (not drawn). For conventional wired charging, a cord and charge coupler plug (not drawn) are also attached to the vehicle. Optionally, the control console 14 may include a wired or wireless communications module 22 operable for receiving vehicle/battery information from the vehicle itself, or from the cloud, on a vehicle-to-infrastructure (V2I) basis. The climate control assembly 29 may include a remote airflow station 12 that supplies a conditioned airflow, a duct system 18 to transport the conditioned airflow from the remote station 12 to the vehicle, an airflow vent 16, and a baffle door 24. Optionally, the climate control assembly may also be equipped with a sensor assembly 21 that includes at least a first temperature sensor 23 measuring the ambient temperature and a second temperature sensor 25 measuring the conditioned airflow temperature.

Here, the conditioned airflow is delivered from the remote airflow station 12 via the duct system 18, similar to a central heating/AC system used in a dwelling or building. Preferably, the duct system 18 is well insulated to minimize thermal losses during transport. Temperature and flow rate of the airflow out of the vent 16 may be manually controlled by a user from the control console 14. The remote station 12 adjusts cooling or heating power on the airflow and fan speed accordingly in response to the user request. Alternatively, the remote station 12 can be automatically controlled via an embedded algorithm based upon at least an ambient temperature read from the first sensor 23. Note that although the charging assembly 19 and the climate control assembly 29 are depicted as integral in FIG. 1, the two assemblies may stand alone as separate parts.

Figure 2:
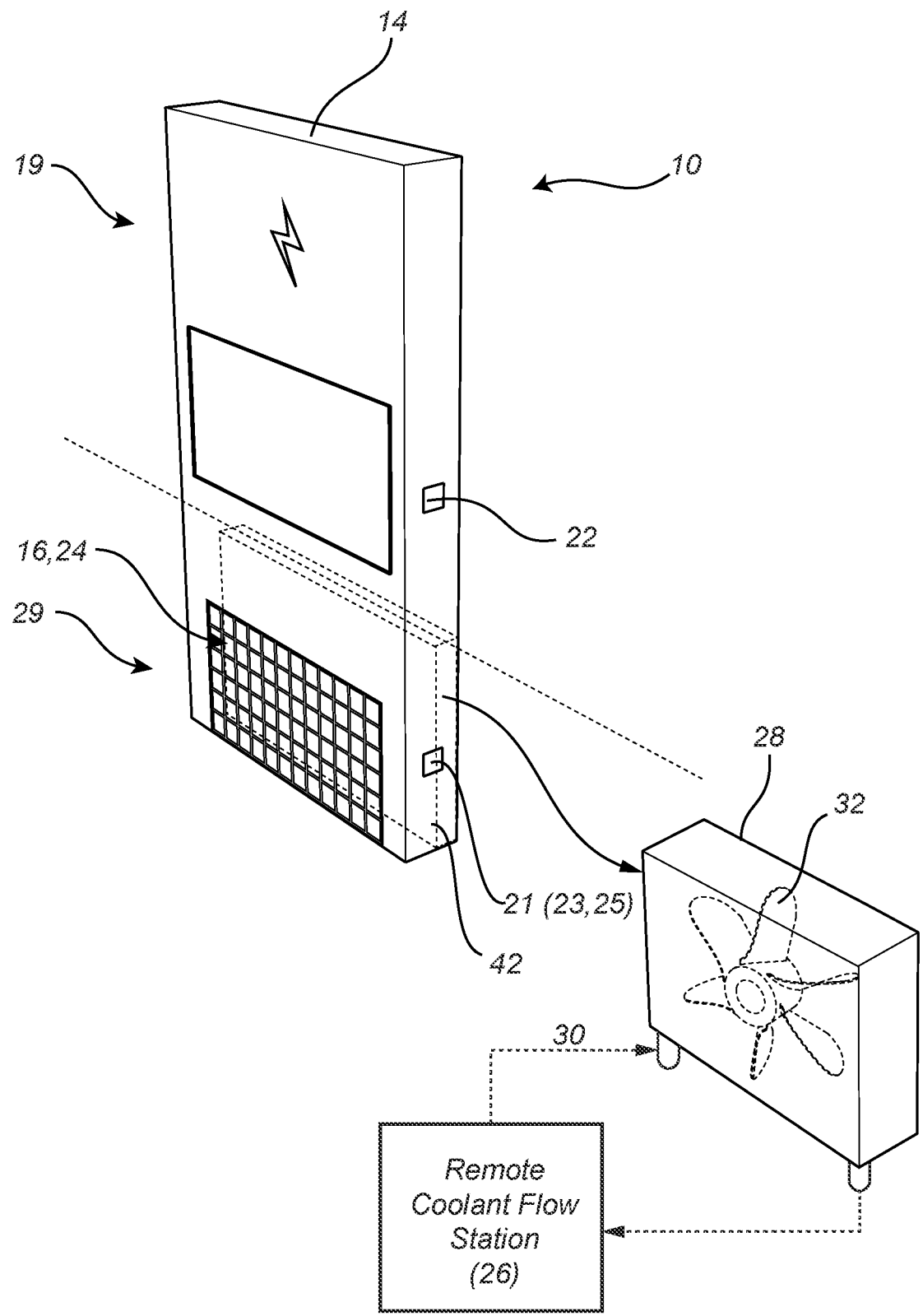
FIG. 2 is a schematic diagram of another illustrative embodiment of the vehicle charging station assembly of the present disclosure, utilizing a remote coolant flow station and a coolant-to-air heat exchanger.

FIG. 2 is a schematic diagram of another illustrative embodiment of the vehicle charging station assembly 10 of the present disclosure, utilizing a remote coolant flow station 26 and a coolant-to-air heat exchanger 28. The charging station assembly 10 comprises a charging assembly 19 and a climate control assembly 29. Comparing to the embodiment in FIG. 1, description on the charging assembly 19 is identical and will not be repeated here. The climate control assembly 29 now includes a remote coolant flow station 26 that supplies a conditioned coolant flow, a hose circuit 30 to transport the conditioned coolant flow from and back to the remote station 26, a coolant-to-air heat exchanger 28, a fan assembly 32, an airflow vent 16, and a baffle door 24. Optionally, the climate control assembly 29 may also be equipped with a sensor assembly 21 that includes at least a first temperature sensor 23 measuring the ambient temperature and a second temperature sensor 25 measuring the conditioned airflow temperature.

Similarly to the embodiment in FIG. 1, the hose circuit 30 is preferably insulated to minimize thermal losses during transport. Temperature and flow rate of the airflow out of the vent 16 may be manually controlled by a user from the control console 14. The remote station 26 adjusts cooling or heating power on the coolant flow to change the coolant temperature into the coolant-to-air heat exchanger 28. Speed of the coolant pump (not drawn) in the hose circuit 30 and speed of the fan assembly 32 are also adjusted accordingly in response to the user request. Alternatively, the remote station 12 and fan assembly 32 can be automatically controlled via an embedded algorithm based upon at least an ambient temperature read from the first sensor 23.

Figure 3:
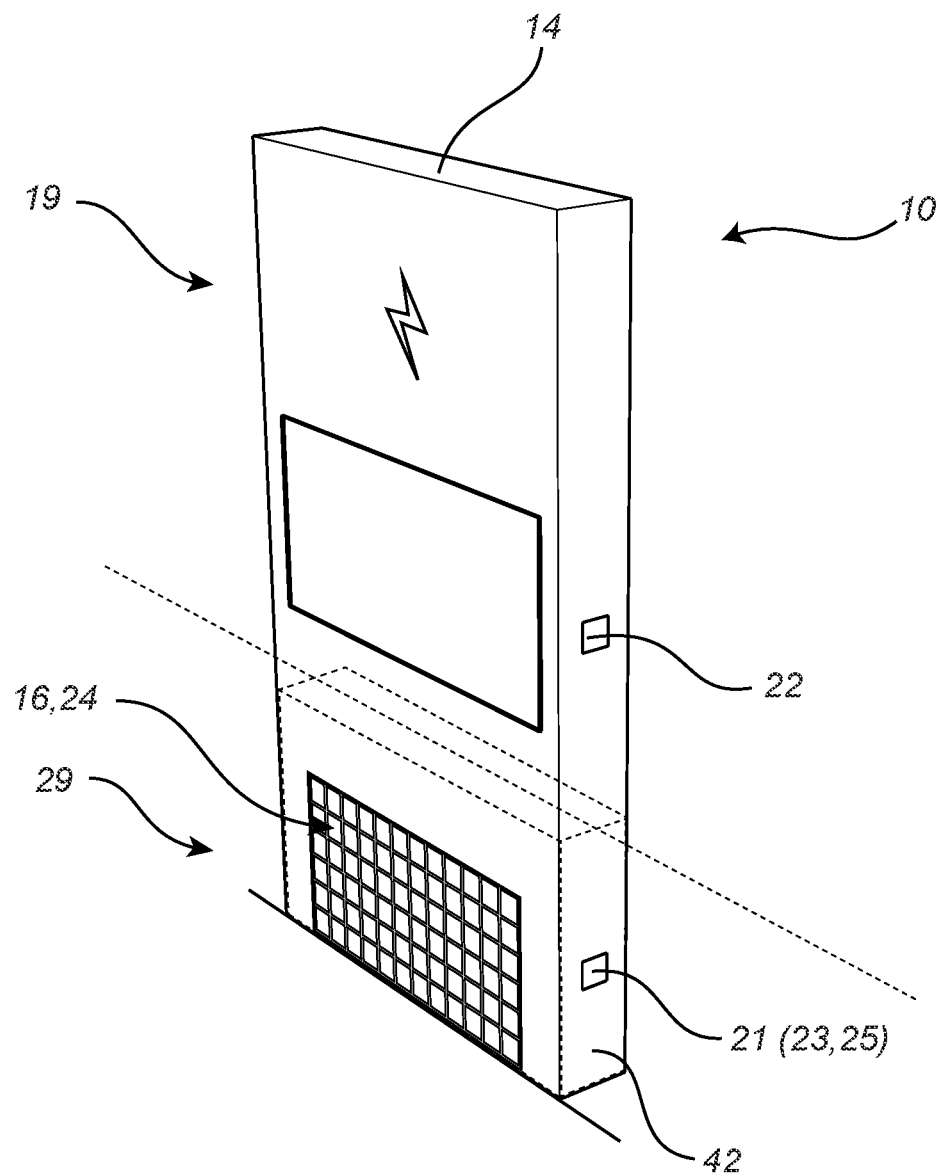
FIG. 3 is a schematic diagram of a further illustrative embodiment of the vehicle charging station assembly of the present disclosure, utilizing a local refrigerant unit.

FIG. 3 is a schematic diagram of a further illustrative embodiment of the vehicle charging station assembly 10 of the present disclosure, utilizing a local refrigerant unit 42. Again, the charging station assembly 10 comprises a charging assembly 19 and a climate control assembly 29. Comparing to the embodiment in FIG. 1, description on the charging assembly 19 is identical and will not be repeated here. The climate control assembly 29 now includes a local refrigerant unit 42 with integrated fan assembly (not drawn) that supplies a conditioned airflow, an airflow vent 16, and a baffle door 24. Optionally, the climate control assembly 29 may also be equipped with a sensor assembly 21 that includes at least a first temperature sensor 23 measuring the ambient temperature and a second temperature sensor 25 measuring the conditioned airflow temperature. Temperature and flow rate of the airflow out of the vent 16 may be controlled manually by a user from the control console 14. The local refrigerant unit 42 adjusts cooling or heating power and fan speed accordingly in response to the user request. Alternatively, they can be controlled automatically via an embedded algorithm based upon at least an ambient temperature read from the first sensor 23.

Figure 4:
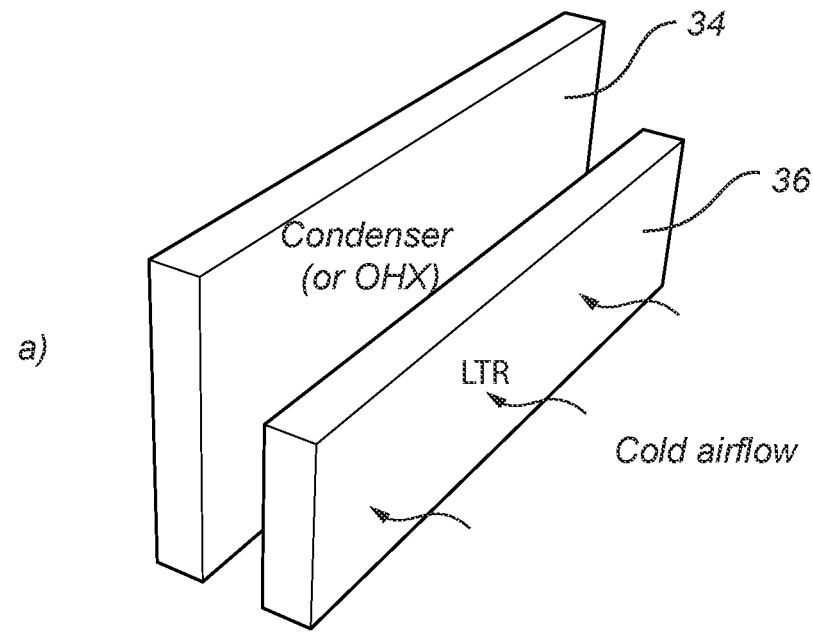
FIG. 4 is a schematic diagram illustrating the mechanism for enhanced cooling capacity in hot ambient conditions using the cold airflow of the present disclosure.
Figure 4:
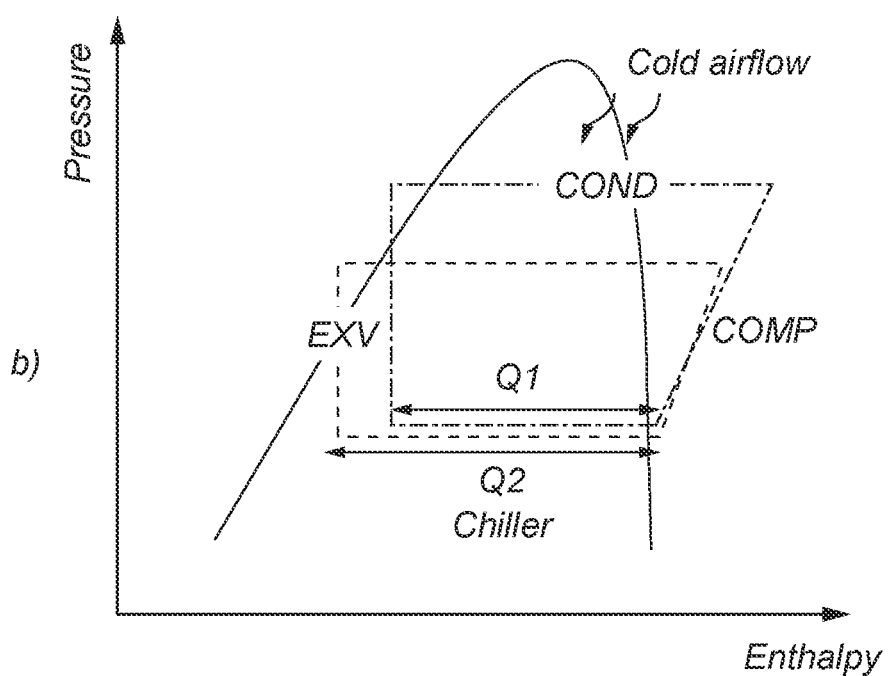

FIG. 4 is a schematic diagram illustrating the mechanism for enhanced cooling capacity in hot ambient conditions using the cold airflow of the present disclosure. FIG. 4a shows a typical front-end module consisting of a condenser (or an outside heat exchanger, OHX, if the refrigerant system is a heat pump) 34, a low-temperature radiator (LTR) 36, and a fan assembly (not drawn). FIG. 4b shows a pressure-enthalpy diagram for vapor compression cycle involving a compressor (COMP), a condenser (COND), an electronic expansion valve (EXV), and a chiller. As the external cold airflow blows across the condenser, the head pressure drops and the vapor compressor cycle is pushed downwards with enhanced cooling capacity from the chiller. Furthermore, the LTR 36 may provide additional heat rejection from the battery if the battery pack and LTR are thermally connected via a coolant circuit. Therefore part of the DCFC load is shifted away from the refrigerant system in the vehicle. This reduces, and potentially eliminates, fan load on the vehicle and overcomes the challenge in upsizing the refrigerant system.

Figure 5:
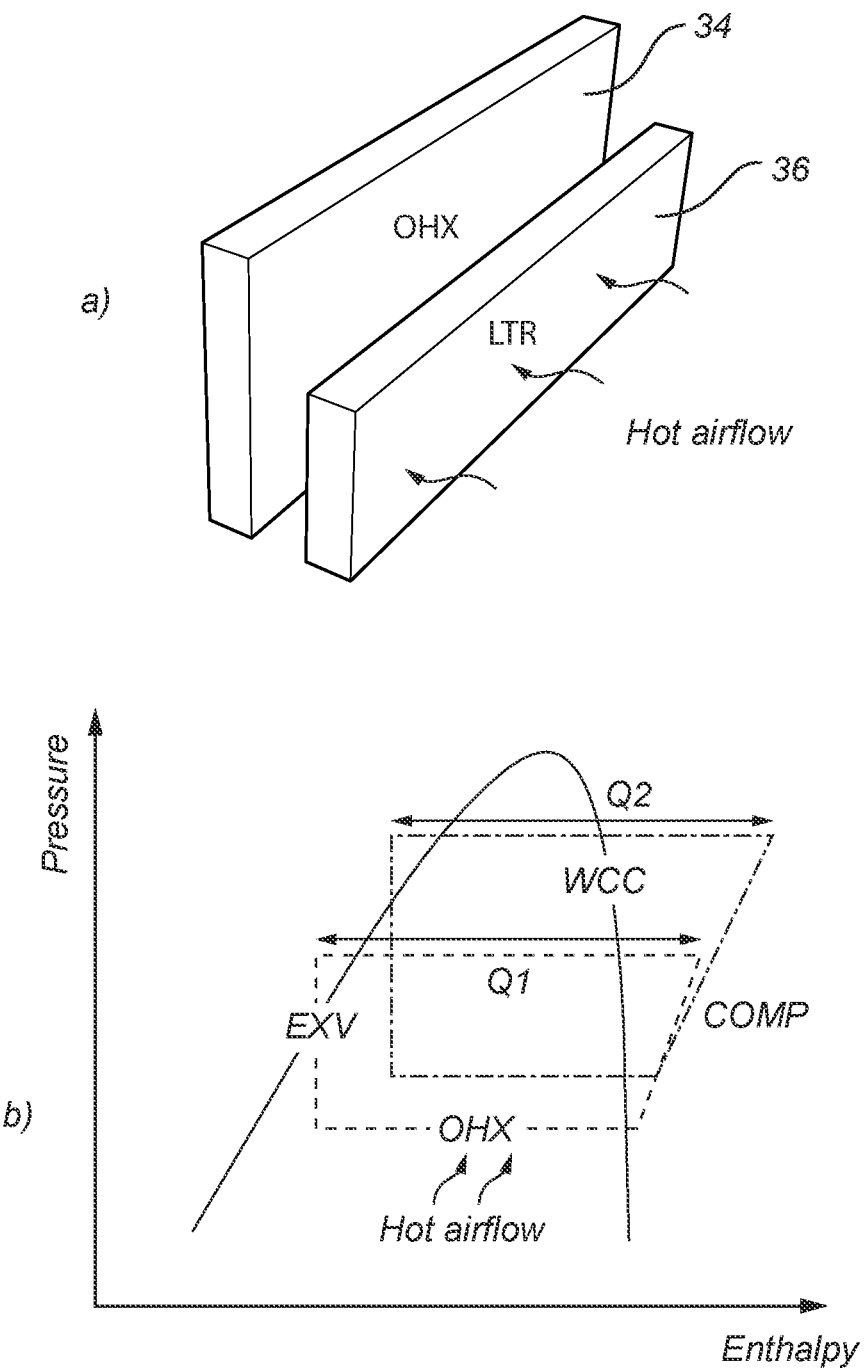
FIG. 5 is a schematic diagram illustrating the mechanism for enhanced heating capacity in cold ambient conditions using the hot airflow of the present disclosure.

FIG. 5 is a schematic diagram illustrating the mechanism for enhanced heating capacity in cold ambient conditions using the hot airflow of the present disclosure. FIG. 5a shows a front-end module in a heat pump system consisting of an outside heat exchanger, OHX, 34, a low-temperature radiator (LTR) 36, and a fan assembly (not drawn). FIG. 5b shows a pressure-enthalpy diagram for vapor compression cycle involving a compressor (COMP), a water-cooled condenser (WCC), an electronic expansion valve (EXV), and an OHX. As the external hot airflow blows across the OHX 34, the low-side pressure increases, hence the refrigerant mass flow rate increases (due to higher density), and the vapor compressor cycle is pushed upwards with enhanced heating capacity from the WCC.

Figure 6:
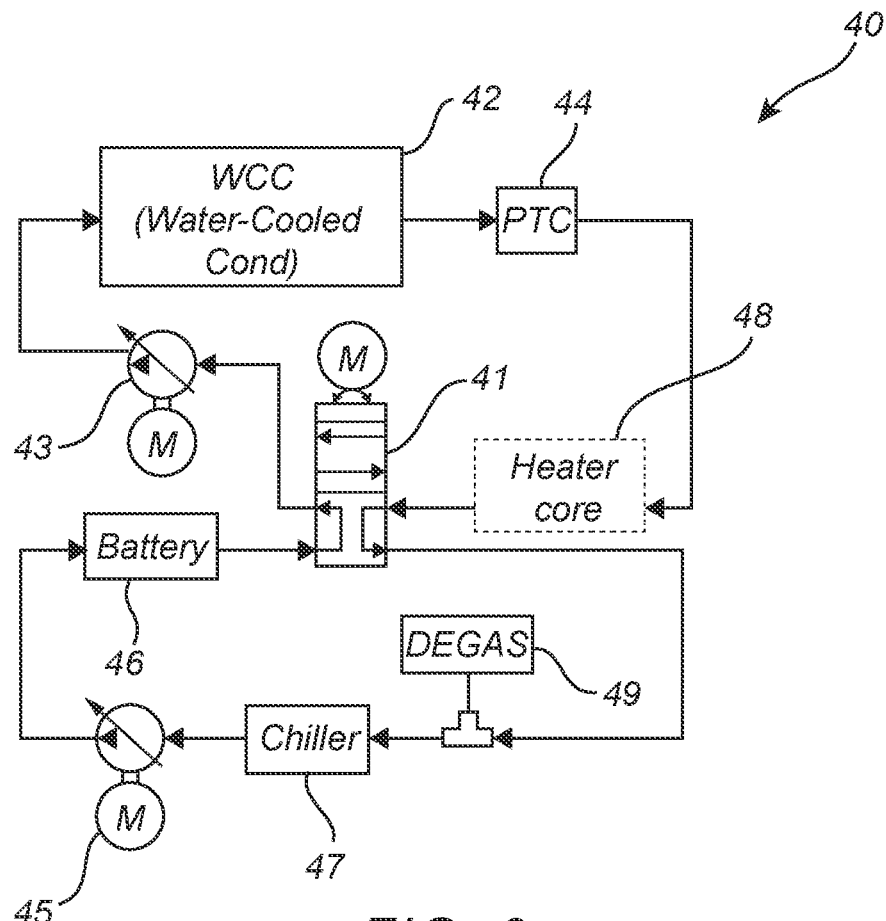
FIG. 6 is a schematic diagram of coolant-side circuit of an illustrative heat pump system, the operation of which is enhanced by the hot airflow of the present disclosure.

FIG. 6 is a schematic diagram of coolant-side circuit of an illustrative heat pump system, the operation of which is enhanced by the hot airflow of the present disclosure. The coolant circuit 40 consists of a four-way valve 41, a water-cooled condenser (WCC) 42, an optional positive temperature coefficient (PTC) heater 44, a heater loop pump 43, a battery loop pump 45, a battery pack 46, a chiller 47, a heater core 48, and a degas bottle 49. The four-way valve 41 is in a position to interconnect the heater loop and battery loop and allow the WCC 42 and battery pack 46 to be thermally communicated. As explained in FIG. 5, heating capacity from the WCC 42 is boosted by the external hot airflow across the OHX, thereby expediting the battery heating and improving the charging rate in cold ambient conditions. The optional PTC heater 44 can be activated to further enhance battery heating in extreme environment (e.g. below −20 degree Celsius). If cabin heating is requested simultaneously during charging process, the HVAC blower will be turned on to allow air to be heated via the heater core 48 and supplied to the cabin. In this case, high heating capacity is particularly appreciated.

Figure 7:
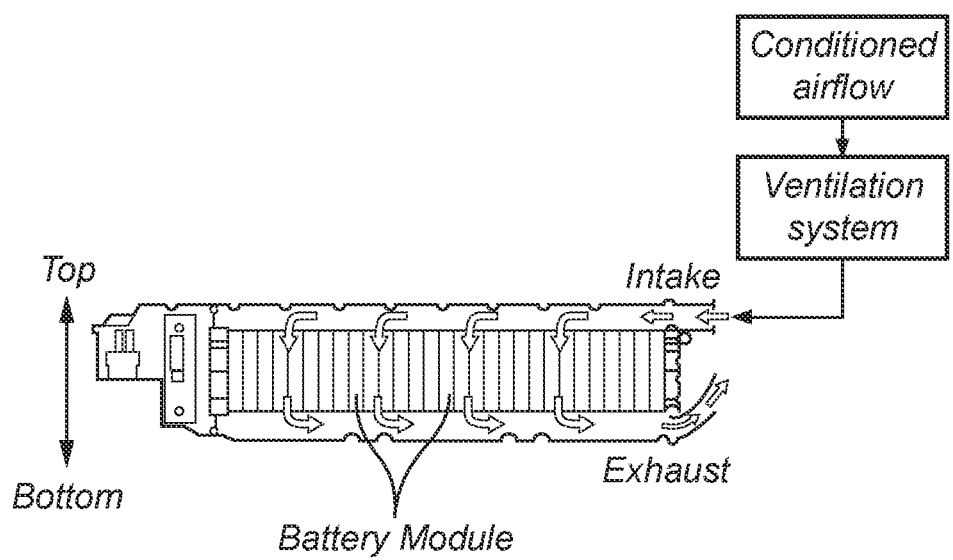
FIG. 7 is a schematic diagram of conditioned airflow routed to the battery module of a vehicle, representing another illustrative embodiment of the vehicle charging station assembly of the present disclosure.

Finally, FIG. 7 is a schematic diagram of conditioned airflow routed to the battery module of a vehicle, representing another illustrative embodiment of the vehicle charging station assembly of the present disclosure. While liquid cooling appears to be mainstream technology nowadays in battery thermal management, air cooling is still being used due to low cost and easiness of implementation. Through an additional ventilation system that comprises at least a duct and blower assembly, the conditioned airflow generated by the charging assembly is routed to the battery module of a vehicle for direct cooling or heating.

The present disclosure is illustrated and described herein with reference to illustrative embodiments and specific examples thereof. It will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A charging station assembly, comprising:
a charging assembly to charge a battery of a vehicle; and a climate control assembly comprising:
- a remote station, remote from the charging assembly, to generate a conditioned airflow that is delivered to the vehicle; and
- a fluid transport system to deliver the conditioned airflow from the remote station to the charging assembly for delivery to the vehicle, wherein the climate control assembly generates a cool conditioned airflow in hot ambient conditions and a hot conditioned airflow in cold ambient conditions.

2. The charging station assembly of claim 1, wherein the climate control assembly comprises:
- the remote station to generate a conditioned coolant flow;
- a coolant-to-air heat exchanger;
- a fan assembly coupled to the coolant-to-air heat exchanger; and
- a fluid transport system to deliver the conditioned coolant flow from the remote station to the coolant-to-air heat exchanger and back to the remote station.

3. The charging station assembly of claim 1, wherein the remote station comprises a local refrigerant unit to generate the conditioned airflow.

4. The charging station assembly of claim 1, wherein the charging station assembly is configured to direct the conditioned airflow toward an outside heat exchanger of a refrigerant system of the vehicle.

5. The charging station assembly of claim 1, wherein the charging station assembly is configured to route the conditioned airflow to a battery pack of the vehicle for direct cooling or heating through an additional ventilation system.

6. The charging station assembly of claim 1, further comprising a control unit operable for controlling a temperature and flow rate of the conditioned airflow.

7. The charging station assembly of claim 6, further comprising a sensor assembly to measure an ambient temperature and conditioned airflow temperature.

8. The charging station assembly of claim 7, wherein the control unit is configured to control the temperature and flow rate of the conditioned airflow responsive to at least an ambient temperature.

9. The charging station assembly of claim 7, further comprising a data transmittal device to read signals from the vehicle on at least battery pack temperature.

10. The charging station assembly of claim 9, wherein the control unit is configured to control the temperature and flow rate of the conditioned airflow responsive to at least an ambient temperature and battery pack temperature.

11. A charging method, comprising:
- charging a battery of a vehicle using a charging assembly;
- generating a conditioned airflow from a remote station of a climate control assembly, the remote station remote from the charging assembly and fluidically coupled with a delivery portion of the climate control assembly, wherein the climate control assembly generates a cool conditioned airflow in hot ambient conditions and a hot conditioned airflow in cold ambient conditions; and
- delivering, by the delivery portion of the climate control assembly, the conditioned airflow to the vehicle.

12. The charging method of claim 11, wherein delivering the conditioned airflow comprises:
- routing the conditioned airflow to an outside heat exchanger of a refrigerant system of the vehicle.

13. The charging method of claim 11, wherein the climate control assembly comprises:
- the remote station generating a conditioned coolant flow;
- a coolant-to-air heat exchanger;
- a fan assembly coupled to the coolant-to-air heat exchanger; and
- a fluid transport system delivering the conditioned coolant flow from the remote station to the coolant-to-air heat exchanger and back to the remote station.

14. The charging method of claim 11, wherein the climate control assembly comprises a local refrigerant unit generating the conditioned airflow.

15. The charging method of claim 11, further comprising controlling a temperature and flow rate of the conditioned airflow using a control unit.

16. The charging method of claim 15, further comprising measuring an ambient temperature and conditioned airflow temperature using a sensor assembly.

17. The charging method of claim 16, further comprising controlling the temperature and flow rate of the conditioned airflow responsive to at least an ambient temperature.

18. The charging method of claim 16, further comprising reading signals from the vehicle on at least battery pack temperature using a data transmittal device.

19. The charging method of claim 18, further comprising controlling the temperature and flow rate of the conditioned airflow responsive to at least an ambient temperature and battery pack temperature.

\* \* \* \* \*